United States Patent Office 3,843,339
Patented Oct. 22, 1974

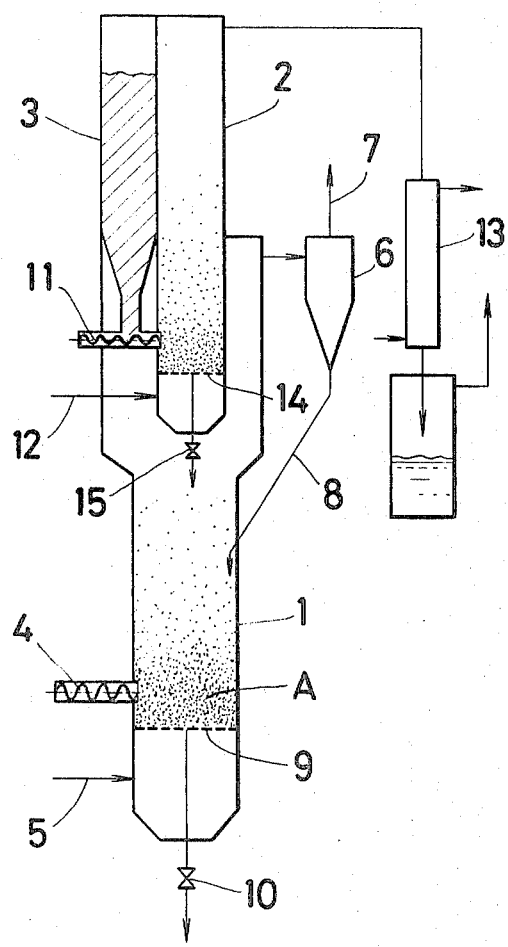

3,843,339
PROCESS FOR FLUIDIZED COMBUSTION
OF PLASTICS
Kiyosi Saito, Sapporo, Japan, assignor to Agency of Industrial Science & Technology, Tokyo, Japan
Filed Sept. 20, 1973, Ser. No. 399,243
Claims priority, application Japan, Sept. 22, 1972
47/95,599
Int. Cl. C10b 57/00
U.S. Cl. 48—197 R            6 Claims

ABSTRACT OF THE DISCLOSURE

A process for the disposal of plastic waste and a device used for practicing the process. The process comprises subjecting the plastic waste in conjunction with air to fluidized combustion, heating the plastic waste with the resultant heat of combustion, fluidizing the plastic waste under heating by means of air, and converting the plastic waste into hydrocarbon oils and hydrocarbon gases. The device comprises a fluidized combustion unit, a fluidization and oxidation unit, etc.

BACKGROUND OF THE INVENTION

This invention relates to a process and device for the disposal of wasted plastics of polyolefins such as polyethylene and polypropylene. More specifically, the invention relates to a process for disposing of plastic waste by combusting a part of the plastic and thereby converting it into an absolutely innoxious gas free from soot and other foreign matter and, at the same time, converting the greater part of the plastic into hydrocarbons useful as fuels and industrial raw materials by utilizing the heat resulting from the aforesaid combustion of a part of the plastic, and to a device used for practicing the process.

The disposal of plastic waste has come to pose a serious problem to the community in recent years in consequence of the incessant increase in the quantities of plastics used. Quantitatively, plastics of polyolefins such as polyethylene and polypropylene account for the majority of the plastics being discarded. Such wasted polyolefinic plastics are generally left to mingle with ordinary trash and then burnt in an ordinary trash incinerator.

When a polyolefinic plastic is burnt in an ordinary incinerator, the plastic is fused and deposited in a form resembling molten gelatin on the grate to obstruct the flow of air. Further, the intensve heat generated from the burning plastic tends to fuse the grate or damage the incinerator proper.

It is technically difficult to have such plastic burnt completely in the ordinary incinerator. The incineration of waste plastic, therefore, entails occurrence of incompletely burnt gas and soot and eventually pollutes the atmosphere.

Various incinerators designed exclusively for the combustion of waste plastics have been suggested with a view to solving the difficulties mentioned above. They invariably have both merits and demerits and none of them have yet been put to effective use.

Attempts have also been made to obtain useful petrochemical raw materials from wasted polyolefinic plastics as the starting materials. For example, research is under way on a process of obtaining heavy oil, light oil, kerosene, ethane and so on by thermally decomposing such plastic waste. This process has not yet been materialized because residue from thermal decomposition accumulates within a thermal decomposition unit and changes the operating conditions of said unit from time to time, because products of thermal decomposition are difficult of separation, because continuous operation of the unit for a prolonged period is difficult to achieve, and so on.

A primary object of this invention is to provide a process for completely combusting a part of polyolefinic plastics, particularly wastes thereof, and thereby converting them into an innoxious gas perfectly free from suspended matter and obtaining useful hydrocarbons from the remaining greater part of said polyolefinic plastics by utilizing the heat generated by said combustion.

Another object of the present invention is to provide a highly effective device for practicing the process described above.

BRIEF EXPLANATION OF THE DRAWING

The drawing illustrates a device according to the present invention.

SUMMARY OF THE INVENTION

According to this invention, a part of wasted plastics, particularly wasted polyolefinic plastics, are completely burnt by fluidized combustion and converted into an innoxious gas and the remaining greater part of the wasted plastics are fused by the heat generated from said combustion and subsequently thermally decomposed in the presence of oxygen and thereby converted into hydrocarbon oils and hydrocarbon gases useful as industrial raw materials and fuels.

The hydrocarbon oils and hydrocarbon gases to be produced as mentioned above may be varied in kind and quantity by regulating the amount of oxygen introduced into wasted plastics or the temperature of heating.

As the device most suitable for effecting the process described above, the present invention employs a fluidized combustion means which is provided in the upper empty space thereof with a means for introducing waste platsics and at a position adjacent thereto with a means for fluidization, partial oxidation and thermal decomposition.

DETAILED DESCRIPTION OF THE INVENTION

First, waste polyolefinic plastics in conjunction with a fluidizing medium added thereto are subjected to fluidized combustion in the presence of air introduced in an amount greater than the amount theoretically required for combustion of said platsics.

The term "fluidizing medium" as used in the present invention refers to a substance of the kind which is added in advance to a fluidized bed in order to ensure sufficient fluidization of reactants participating in fluidized reactions such as fluidized combustion.

Waste plastics are divided in advance to a suitable size, as occasion demands, to warrant ease of fluidization. Although sand and coal ash are typical substances that serve satisfactorily as the fluidizing medium, other substances may also be used in so far as they are physically and chemically stable and remain unaffected by the heat generated from the fluidized combustion. The size of the fluidizing medium is limited to the range of from 0.1 to 0.3 mm.

The mixture of waste platsics and the fluidizing medium is fluidized with air and combusted. The amount of air to be used for this purpose must be in excess of that which required for complete combustion of the wasted plastics. The excess air enables the mixture of plastics and fluidizing medium to form a fluidized bed, with the result that the plastics are combusted and the gas generated from the combustion is continuously discharged.

Since air is amply suplied and the plastics are fluidized by the air, the combustion is effected substantially completely and the amount of solids entrained by the gas from the combustion is extremely small. The gas to be discharged into the atmosphere is not allowed to have even the smallest content of noxious substances. Therefore, it is treated by a solid-gas separator such as, for example, a cyclone and deprived of solids prior to release into the atmopshere.

Plastics at times contain various additives to meet the purposes of their manufacture. Upon combustion, such additives may form noxious substances. In the case of such plastics, the gas from the combustion may suitably be scrubbed by a known method to be freed of such noxious substances.

Once the combustion is started by ignition, it can be carried out continuously by supplying plastics continuously. The combustion can easily be accomplished by regulating the amount of air supplied and that of plastics introduced so that the heat of combustion is retained in the range of from 600° C. to 800° C.

In the course of the fluidized combustion, low-grade coal or some other supplementary fuel may be added to accelerate the combustion.

The formation of hydrocarbon oils and hydrocarbon gases by the oxidation of wasted plastics will be explained herein below. First waste plastics are fused. The heat generated from said fluidized combustion is exploited as the heat required for effecting said fusion.

Although the temperature at which the fusion is effected varies with the kind of plastics to be fused, most polyolefinic plastics (such as plastics of polyethylene and polypropylene) which are generally used are invariably dissolved when heated to about 300° C.–500° C. Then the fused plastics are maintained at a prescribed temperature by means of the heat from said fluidized combustion and, in the presence of an added fluidizing medium, fluidized by introducing therein a forced current of oxygen, with the result that the plastics are oxidized and thermally decomposed and, consequently, converted into hydrocarbon oils and hydrocarbon gases of high purity. Here, the term "hydrocarbon oils" refers to hydrocarbons which are liquid at normal room temperature (about 25° C.) and the term "hydrocarbon gases" to hydrocarbons which are gaseous at normal room temperature. The yield of hydrocarbon oils can be increased by blowing oxygen in an amount about one twenty-fifth of the amount theoretically required for complete combustion of polyolefinic plastics and regulating the temperature of the fluidized bed in the range of 570° C.–630° C. In this case, hydrocarbon oils account for not less than 60% by weight of all the hydrocarbons to be formed. Where hydrocarbon gases such as olefin gases are desired to be obtained in a larger amount, it suffices to blow oxygen in an amount about one fifteenth of the amount theoretically required for compete combustion of plastics and, at the same time, regulate the temperature of the fluidized bed in the range of 700° C.–800° C. In this case, olefin gases account for not less than 80% by weight of all the hydrocarbons to be formed. Upon thermal decomposition, the fused plastics produce some carbonaceous substance in addition to gases. This carbonaceous substance deposits itself on a part of the fluidizing medium. The fluidizing medium on which said carbonaceous substance has been deposited, because of difference of specific gravity, sinks downward in the fluidized bed and begins to flow in the lower zone of the fluidized bed. The incoming oxygen and the carbonaceous substance on the medium react to cause partial combustion, which is believed to contribute to the promotion of the thermal decomposition.

The thermal decomposition, thus, produces said carbonaceous substance. However, this carbonaceous substance does not obstruct the fluidization. Nor does it clog pipes. This means that no protective means is required against occurrence of said carbonaceous substance. Thus, a small device will suffice for the purpose of the process described above.

During said oxidation and thermal decomposition of plastics, since the fluidized bed is maintained around 600° C.–800° C., the formed hydrocarbons are vaporized out of said fluidized bed. Hydrocarbon oils and hydrocarbon gases can be separated from the vaporized gas by collecting the gas and cooling it. A device employed for practicing the present invention will be described herein below.

The device of the present invention comprises (a) a fluidized combustion means, (b) a means for the fluidization and partial oxidation disposed in the upper empty space in the interior of said fluidized combustion means and (c) a means adapted to supply plastics to said means for the fluidization and partial oxidation and disposed in the upper empty space in the interior of said fluidized combustion means.

The device as a whole has a structure capable of improving the thermal efficiency, because both the means (b) and (c) can utilize the heat generated by the combustion in the fluidized combustion means.

The device of this invention will be explained with reference to the drawing.

Referring to the drawing, 1 denotes a fluidized combustion means, 2 a means for the fluidization and partial oxidation disposed in the upper empty space in the interior of the fluidized combustion means 1, and 3 a means adapted to supply plastics to the means 2 for the fluidization and partial oxidation. Denoted by 4 is a means for supplying the plastic waste to be disposed of to said fluidized combustion means. In the illustrated embodiment, a screw feeder is used as the means 4. A distribution plate 9 supports a fluidized bed. 5 denotes a pipe for introducing into the fluidized combustion means 1 the air which is used for fluidization and combustion. The air which has been introduced via the pipe 5 passes through the distribution plate 9 and causes fluidization and combustion of the plastic waste A deposited on the plate 9. The gas generated in consequence of the fluidized combustion is removed through the head portion of the fluidized combustion means 1. Solids contained in this gas are separated by a cyclone 6 in the case of the illustrated embodiment. The gas which contains absolutely no solids is released as an innoxious gas via an outlet 7. The solids which have been collected by the cyclone 6 are sent through a pipe 8 and returned to the fluidized combustion means 1. At the bottom of the fluidized combustion means, there is disposed a valve 10. This valve 10 is intended to remove the fluidizing medium or the residue of combustion or to adjust the height of the fluidized bed of the medium. The means 2 for the fluidization and partial oxidation and the means 3 for the supply of plastics are both disposed in the upper empty space within the the fluidized combustion means 1 and they are heated by the heat from the combustion which occurs in the means 1.

The plastic waste, when thrown into the plastic supply means 3, is fused by the heat and converted to a liquid form. The liquid plastic is supplied to the means 2 for the fluidization and partial oxidation by virtue of a supply means 11, which is a screw feeder in the case of the illustrated embodiment. This means 2 for the fluidization and partial oxidation is provided at the bottom thereof with a distributing plate 14 serving to support the fluidized bed. It is further provided below the distributing plate 14 with a pipe 12 for supplying oxygen for fluidization and partial oxidation and a pipe containing a valve 15 for withdrawing the contents from the fluidized bed. When the fused plastic is introduced by the screw feeder 11 into the means 2 for the fluidization and partial oxidation, the oxygen from a supply pipe 12 is sent through the distributing plate and introduced into the fused plastic. The fluidizing medium is placed in advance on the distributing plate 14. The fused plastic and the fluidizing medium are urged by the incoming oxygen to form a fluidized bed, with the result that the fused plastic is oxidized and thermally decomposed. The thermally decomposed, oxidized gas (hydrocarbon gases) is delivered to a condenser and separated into a liquid and a gas, which are recovered independently of each other.

The following example is further illustrative of this invention. It should be understood that the present invention is not limited thereto.

Example

Device: The device of the present invention explained above was used. The components of this device, invariably made of stainless steel, had the following dimensions.

Fluidized combustion means—1200 mm. in height, 300 mm. in upper inside diameter and 200 mm. in lower inside diameter.

Means for fluidization and partial oxidation disposed in the upper empty space within the fluidized combustion means—1000 mm. in height and 110 mm. in inside diameter.

Means for supply of plastics to means for fluidization and partial oxidation disposed in the upper empty space within the fluidized combustion means—700 mm. in height and 90 mm. in inside diameter.

Screw feeder for fluidized combustion means—25 mm. in diameter.

Screw feeder for means for fluidization and partial oxidation—25 mm. in diameter.

Materials used in the device:

|  | Polyethylene | Polypropylene |
|---|---|---|
| Specific gravity | 0.93 | 0.91 |
| Melting point, °C | 120–130 | 160–170 |
| Heat produced, (kcal./kg.) | 11,000 | 10,500 |
| Grain size, mm | 5 | 4 |

Supply of plastics to the device: To the fluidized combustion means, polyethylene and polypropylene plastics were supplied at respective rates of 0.45 kg./hour and 0.1 kg./hour by the screw feeder. As the fluidizing medium, about 10 kg. of sand having a grain size of 0.1–0.3 mm. was placed in advance in the fluidized combustion means. Air was introduced to the lower section of the fluidized combustion means at a rate of 18.6 cm./sec. The materials charged were ignited at the outset of the operation. The combustion of the materials was maintained by continuing the introduction of the materials and air at the rates indicated above, with the temperature kept at 750° C. to effect fluidized combustion.

The gas discharged at a rate of 8.3 m.$^3$ per hour via the cyclone of the fluidized combustion means was found to have the following composition (in percentage by weight)

| | |
|---|---|
| $H_2$ | 0.5 |
| $O_2$ | 1.4 |
| $CO$ | 2.0 |
| $CH_4$ | 1.3 |
| $CO_2$ | 13.6 |
| $C_2H_6$ | 0.7 |
| $N_2$ | 80.5 |

The effluent gas had absolutely no solids content and was innoxious.

Separately, the means for fluidization and partial oxidation was packed in advance with about 6 kg. of sand having a grain size of 0.1–0.3 mm. as the fluidizing medium. To the supply means, polyethylene plastic and polypropylene plastic were delivered at respective rates of 2.5 kg./hour and 0.5 kg./hour by the screw feeder. Oxygen was supplied at two rates of 300 Nl./hour and 500 Nl./hour.

The supply means was heated to about 300° C.–500° C. with the heat of combustion in the fluidized combustion means and both polyethylene and polypropylene plastics were fused. The fused plastics were delivered by the screw feeder to the means for fluidization and partial oxidation at the aforementioned rates.

By the oxygen introduced through the lower section of the means for fluidization and partial oxidation, the fused polyethylene was fluidized in conjunction with the fluidizing medium and subjected to oxidation and thermal decomposition. The gas generated consequently was cooled by the condenser to 5° C. and separated into hydrocarbon gases and hydrocarbon oils.

The results of the operation will be described herein below.

(a) In the operation having oxygen supplied at the rate of 300 Nl./hour:

In this case, the amount of oxygen supplied was one twenty-fifth of the amount of oxygen required for complete combustion of the plastic.

The fluidized bed was controlled to a temperature of 620° C.

Consequently, the plastic was gasified through oxidation and thermal decomposition. This gas was cooled by the condenser to 5° C. to afford 1.2 kg. of a gas containing hydrocarbons and 1.8 kg. of hydrocarbon oils.

The yield of the oils was 60%. The composition of the gas and the oils were as shown below.

Gas composition (percent by weight):

| | |
|---|---|
| $H_2$ | 0.9 |
| $CH_4$ | 8.0 |
| $C_2H_4$ | 20.8 |
| $C_2H_6$ | 7.3 |
| $C_3H_8$ | 22.7 |
| $C_4H_8$ | 14.5 |
| $O_2$ | 0 |
| $N_2$ | 0.2 |
| $Cl$ | 9.0 |
| $CO_2$ | 16.6 |
| $(C_2-C_4)$ | 65.3 |

Oil composition (percent by weight):

| | |
|---|---|
| $C_6-C_{10}$ | 6.5 |
| $C_{11}-C_{15}$ | 17.5 |
| $C_{16}-C_{20}$ | 32.0 |
| $C_{21}$ or more | 44.0 |

(b) In the operation having oxygen supplied at the rate of 500 Nl./hour:

In this case, the amount of oxygen supplied was one fifteenth of the amount of oxygen required for complete combustion of the plastic.

The fluidized bed was controlled to a temperature of 770° C.

Similarly to the case of (a), the plastic was gasified through oxidation and thermal decomposition and then cooled to 5° C. Consequently, there were obtained 2.46 kg. of a gas containing hydrocarbons and 0.54 kg. of hydrocarbon oils.

The yield of oils was 18%.

The compositoins of the gas and the oils were as shown below.

Gas composition (percent by weight):

| | |
|---|---|
| $H_2$ | 1.1 |
| $CH_4$ | 10.5 |
| $C_2H_4$ | 20.7 |
| $C_2H_6$ | 6.2 |
| $C_3H_6$ | 17.7 |
| $C_4H_8$ | 11.4 |
| $O_2$ | 0 |
| $N_2$ | 0.3 |
| $CO$ | 11.2 |
| $CO_2$ | 20.9 |
| $(C_2-C_4)$ | 56 |

Oil composition (percent by weight):

| | |
|---|---|
| $C_6-C_{10}$ | 2.0 |
| $C_{11}-C_{15}$ | 9.5 |
| $C_{16}-C_{20}$ | 22.5 |
| $C_{21}$ or more | 66 |

What is claimed is:

1. A process for the disposal of a polyolefinic plastic which comprises dividing said polyolefinic plastic into at least two portions and subjecting a portion of the polyolefinic plastic in conjunction with a fluidizing medium to fluidized combustion by means of air of an amount exceeding the amount theoretically required for combustion of said plastic thereby gasifying the plastic, simultaneously fusing the remaining portion of the polyolefinic plastic with the heat generated by said fluidized combustion and, while maintaining the fused polyolefinic plastic in a liquid form by utilizing the heat of the aforementioned combustion, fluidizing and partially oxidizing the fused polyolefinic plastic in conjunction with a fluidizing medium by means of an amount of oxygen insufficient for complete combustion thereby producing a hydrocarbon gas and cooling said gas for thereby obtaining hydrocarbon oils and hydrocarbon gases useful as industrial raw materials.

2. A process according to claim 1, wherein the temperature of the fluidized combustion is in the range of from 600° C.–800° C.

3. A process according to claim 1, wherein a supplementary fuel is used for fluidized combustion.

4. A process according to claim 1, wherein the fluidizing medium is one or more members selected from the group consisting of sand and coal ash having a grain size of about 0.1–0.3 mm.

5. A process according to claim 1, wherein the oxygen for the fluidization of the fused polyolefinic plastic is supplied in an amount about one twenty-fifth of the amount required for complete combustion of said polyolefinic plastic and said fused polyolefinic plastic is partially oxidized at about 570° C.–630° C.

6. A process according to claim 1, wherein the oxygen for the fluidization of the fused polyolefinic plastic is supplied in an amount about one fifteenth of the amount required for complete combustion of said polyolefinic plastic and said fused polyolefinic plastic is partially oxidized at about 700° C.–800° C.

References Cited

UNITED STATES PATENTS

| 3,716,339 | 2/1973 | Shigaki et al. | 201—25 |
| 3,671,209 | 6/1972 | Teichmann et al. | 48—215 |
| 3,697,256 | 10/1972 | Engle | 48—209 UX |

FOREIGN PATENTS

| 687,942 | 1930 | France | 48—209 |

S. LEON BASHORE, Primary Examiner

R. PACE, Assistant Examiner

U.S. Cl. X.R.

48—209; 201—2.5, 25